(12) United States Patent
Hess et al.

(10) Patent No.: US 11,946,500 B2
(45) Date of Patent: Apr. 2, 2024

(54) COMPRESSION CONTACT TO MONITOR FASTENER ELONGATION AND GRIP FORCE

(71) Applicants: Markus Jaan Hess, Thornhill (CA); John Carlos Sousa, Mono (CA)

(72) Inventors: Markus Jaan Hess, Thornhill (CA); John Carlos Sousa, Mono (CA)

(73) Assignee: Loose Wheel Sensors Inc., Woodbridge (CA)

( * ) Notice: Subject to any disclaimer, the term of this patent is extended or adjusted under 35 U.S.C. 154(b) by 909 days.

(21) Appl. No.: 16/988,515

(22) Filed: Aug. 7, 2020

(65) Prior Publication Data

US 2021/0040977 A1 Feb. 11, 2021

(30) Foreign Application Priority Data

Aug. 7, 2019 (CA) ................................ CA 3050438

(51) Int. Cl.
*F16B 31/02* (2006.01)
*B60B 3/14* (2006.01)
*F16B 43/00* (2006.01)

(52) U.S. Cl.
CPC ............ *F16B 31/028* (2013.01); *B60B 3/145* (2013.01); *F16B 43/00* (2013.01)

(58) Field of Classification Search
CPC ......... F16B 31/028; F16B 43/00; B60B 3/145
USPC ..................................................... 340/686.2
See application file for complete search history.

(56) References Cited

U.S. PATENT DOCUMENTS

| 2,600,029 | A | 6/1952 | Rivington |
| 3,248,923 | A | 5/1966 | Blakeley |
| 3,589,234 | A | 6/1971 | Trigg |
| 3,799,108 | A | 3/1974 | Mosow |
| 3,850,133 | A | 11/1974 | Johnson |

(Continued)

FOREIGN PATENT DOCUMENTS

| CA | 2069319 A1 | 5/1991 |
| GB | 1316899 A | 5/1973 |

(Continued)

OTHER PUBLICATIONS

International Search Report and Written Opinion of PCT/IB2017/056519, dated Feb. 26, 2018.

*Primary Examiner* — Zhen Y Wu
(74) *Attorney, Agent, or Firm* — Cherskov Flaynik & Gurda, LLC (57) ABSTRACT

A clamping force monitoring device is provided having a step washer, a contact plate, a compression washer separating the step washer and the contact plate, a threaded fastener extending through the step washer and the compression washer, a nut and an electric circuit, wherein when a sufficient axial force is exerted in the threaded fastener by engagement of the nut, the compression washer is compressed and the step washer is in contact with the contact plate, thereby closing the electric circuit. A method for monitoring a threaded fastener is provided including extending a threaded fastener through a step washer and a compression washer and engaging the threaded fastener with a nut, wherein when a sufficient axial force is applied to the threaded fastener by the nut, the compression washer is compressed and the step washer contacts a contact plate, thereby closing an electric circuit.

19 Claims, 8 Drawing Sheets

(56) References Cited

U.S. PATENT DOCUMENTS

| | | | |
|---|---|---|---|
| 3,969,713 A | | 7/1976 | Bossler, Jr. |
| 3,978,761 A | * | 9/1976 | Sosinski ............... F16B 31/028 411/959 |
| RE30,183 E | | 1/1980 | Popenoe |
| 4,636,120 A | | 1/1987 | Brandsberg et al. |
| 4,887,948 A | * | 12/1989 | Calmettes ............. F16B 31/028 411/10 |
| 4,921,380 A | * | 5/1990 | Tronetti, Jr. .......... F16B 31/028 411/12 |
| 4,951,501 A | * | 8/1990 | MacAnally ......... B60C 23/0496 137/227 |
| 5,102,273 A | | 4/1992 | Stanage |
| 5,291,789 A | | 3/1994 | Walton |
| 5,552,759 A | | 9/1996 | Stoyka |
| 5,584,527 A | | 12/1996 | Sitter |
| 6,158,933 A | | 12/2000 | Nicholson |
| 6,398,312 B1 | | 6/2002 | Marczynski et al. |
| 7,412,896 B2 | | 8/2008 | Janik et al. |
| 7,520,174 B2 | | 4/2009 | Clarke |
| 7,658,641 B1 | * | 2/2010 | Maxwell ............... H01R 11/282 439/548 |
| 7,994,901 B2 | | 8/2011 | Malis et al. |
| 8,087,860 B1 | * | 1/2012 | Crozier, III ............... B60B 3/16 301/35.623 |
| 8,152,426 B2 | | 4/2012 | Marczynski |
| 8,872,668 B2 | | 10/2014 | Schnare |
| 9,483,674 B1 | * | 11/2016 | Fink ................... G06K 7/10366 |
| 10,788,384 B1 | * | 9/2020 | Chen ........................ G01L 1/14 |
| 2004/0166709 A1 | * | 8/2004 | West ....................... H01R 4/302 439/101 |
| 2005/0083186 A1 | * | 4/2005 | Hayes ....................... B60B 3/16 340/687 |
| 2005/0123828 A1 | * | 6/2005 | Oogami ............... H01M 50/569 429/152 |
| 2006/0281348 A1 | * | 12/2006 | Burris ................... H01R 9/0524 439/108 |
| 2007/0193361 A1 | * | 8/2007 | Coffey .................... G01L 5/243 73/780 |
| 2011/0309611 A1 | * | 12/2011 | Smith ..................... H02G 3/065 285/139.3 |
| 2012/0155988 A1 | * | 6/2012 | Schumacher ........... F16B 31/02 411/369 |
| 2013/0049952 A1 | * | 2/2013 | Schnare ................. G01B 7/003 324/693 |
| 2013/0186951 A1 | * | 7/2013 | Zhu ........................ F16B 31/02 235/375 |
| 2013/0302106 A1 | * | 11/2013 | Appl .................... F16B 31/028 411/8 |
| 2015/0322993 A1 | * | 11/2015 | Brewer ................. F16B 37/048 156/66 |
| 2016/0040709 A1 | * | 2/2016 | Achtner ................... B23P 19/06 29/525.01 |
| 2017/0256105 A1 | * | 9/2017 | Lopes ..................... B60B 27/065 |

FOREIGN PATENT DOCUMENTS

| | | |
|---|---|---|
| GB | 2381056 A | 4/2003 |
| GB | 2508152 B | 11/2014 |
| GB | 2536294 A | 9/2016 |
| WO | 2009049060 A2 | 4/2009 |
| WO | 2016042513 A1 | 3/2016 |

* cited by examiner

COMPRESSION CONTACT TO MONITOR FASTENER ELONGATION AND GRIP FORCE

PRIORITY CLAIM

Priority is claimed to Canadian Patent Application No. 3,050,438, filed on Aug. 7, 2019, presently pending, the contents of which is fully incorporated herein.

TECHNICAL FIELD

This disclosure pertains to the monitoring of threaded fasteners, and more particularly, it relates to a clamping force monitoring device.

BACKGROUND

Vehicle wheel rims are commonly mounted to a hub by lug nuts fastened down on an equal number of wheel studs. Failure of wheel studs may occur when lug nuts come loose or if the material of the wheel and vehicle components gripped by the wheel studs and lug nuts diminish and disintegrate. Runaway truck wheels occur at an alarmingly high rate and unfortunately can and have resulted in fatal incidents. It is estimated that the number of runaways is over 50,000 per year. This is an issue that is exacerbated by several points:
1. An extremely large number of trailers on the road. There are nearly 2 million semi trucks in operation in the U.S., and around 5.6 million semi trailers. This equates to 456 million studs that are required to be correctly tightened.
2. Trailers on the road are in a wide range of mechanical condition, from well maintained to states of neglect.
3. Torquing of Nuts onto Wheel Studs to hold wheels on hubs is an unreliable measure. When studs or nuts are corroded, a portion of the torque that is applied goes to overcoming Nut-Stud friction rather than into stud clamping force. A study by Accurim showed wheel clamp force ranged from 10,000 lb. to 60,000 lb. depending upon stud condition.
4. Dual rims have an inherent issue that the metal where rims are in contact with each other will wear, thus reducing the material being gripped, so that the clamp force reduces and nuts are loose without turning.

A properly torqued stud is elongated by a very small amount. Full torque elastically stretches a bolt in the range of five thousands (0.0056") of an inch. Consistently and economically ensuring that the millions of studs on the road are stretched to the proper amount is hardly viable.

Despite the advances in this field, there remains a need for a system capable of measuring a change in tension in a threaded fastener and bearing condition and to warn a vehicle operator of a dangerous condition of that wheel stud.

SUMMARY

In the present disclosure, there is described a clamping force monitoring device that detects precarious conditions on a threaded fastener. These conditions can be readily transmitted to the operator of the vehicle to avoid a hazardous situation.

In a first aspect of the present invention, there is provided a clamping force monitoring device, having a step washer with an outer face, an inner face and a contact protrusion protruding to a depth from the inner face, a contact plate for making contact with the step washer, a compression washer abutting the inner face of the step washer and extending to at least the contact protrusion of the step washer, the compression washer being compressible and having a thickness greater than the protrusion depth when not compressed, for separating the step washer and the contact plate, a threaded fastener for extending through the step washer and the compression washer, a nut for engaging with the threaded fastener, and an electric circuit for sensing a contact condition between the contact plate and the step washer; wherein when a sufficient axial force is exerted in the threaded fastener by engagement of the nut, the compression washer is compressed to a thickness equal to the depth of the protrusion and the step washer is in contact with the contact plate, thereby closing the electric circuit.

In another aspect of the present invention, there is provided a method for monitoring a clamping force on a threaded fastener comprising extending a threaded fastener through a step washer and a compression washer and engaging the threaded fastener with a nut, wherein when a sufficient axial force is applied to the threaded fastener by the nut, the compression washer is compressed to a thickness equal to the depth of a protrusion in the step washer and the protrusion in the step washer contacts a contact plate, thereby closing an electric circuit, and further wherein when an axial force less than the sufficient axial force is applied to the threaded fastener by the nut, the compression plate is not compressed to a thickness equal to the depth of the protrusion in the step washer and the protrusion in the step washer is not in contact with the contact plate, thereby opening the electric circuit.

A more complete understanding of the clamping force monitoring device can be obtained by reference to the following detailed description of the preferred embodiments thereof in connection with the attached drawings.

BRIEF DESCRIPTION OF THE DRAWINGS

Embodiments of the clamping force monitoring system are described herein with the aid of the accompanying drawings, in which like numerals denote like parts throughout the several views.

The drawings presented herein are presented for convenience to explain the functions of the elements included in the preferred embodiments of the threaded fastener monitoring system. Elements and details that are obvious to the person skilled in the art may not have been illustrated. Conceptual sketches have been used to illustrate elements that would be readily understood in the light of the present disclosure. Some details have been exaggerated for clarity. These drawings are not fabrication drawings and should not be scaled.

DETAILED DESCRIPTION

The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

In the following figures, a clamping force monitoring system is illustrated as a wheel stud monitoring system by way of example. It will be understood by those skilled in the art that the disclosure provided may be used to monitor clamping force in other threaded fastener systems.

Figure 1:
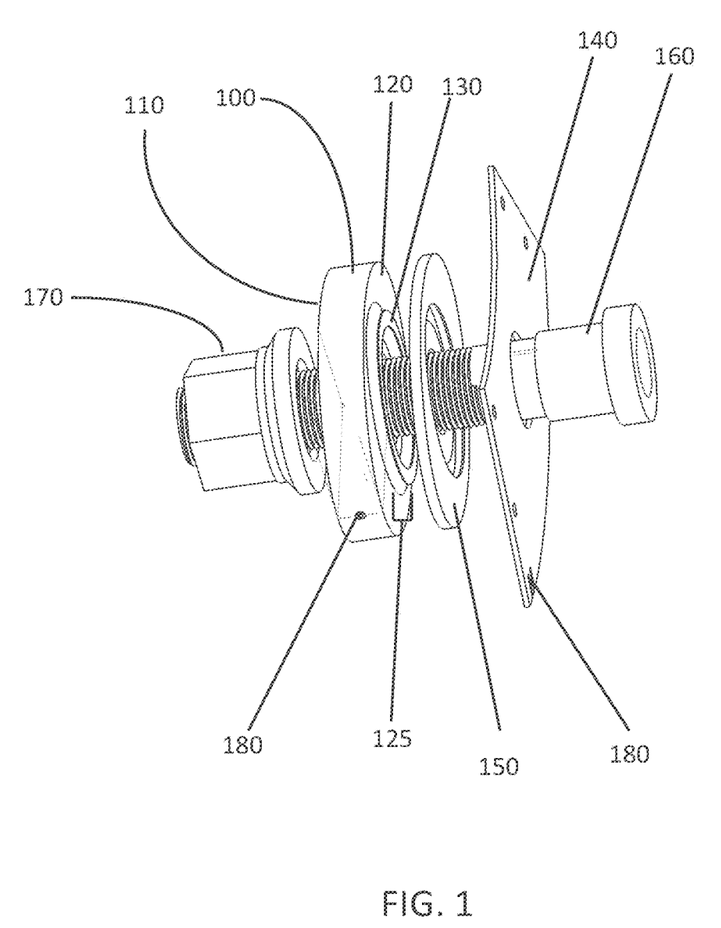
FIG. 1 is an exploded view of an embodiment of a clamping force monitoring system.

Referring to FIG. 1, an embodiment of a clamping force monitoring system is illustrated. A step washer 100 has an outer face 110 (not visible), an inner face 120 and a contact protrusion 130 protruding to a depth 125 from the inner face. The contact protrusion 130 may extend from the inner face 120 of the step washer 100 around the inner periphery of the step washer as depicted in FIG. 1, or it may protrude around the outer periphery of the step washer. A contact plate 140 faces the step washer inner face 120. A compression washer 150 lies between the step washer 100 and the contact plate 140, against the step washer inner face 120. When not compressed, the compression washer 150 is thicker than the depth 125 of the inner face 120 from the contact protrusion 130. Thus the compression washer 150 separates the contact protrusion 130 and the contact plate 140. If the compression washer 150 is compressed until its thickness equals the depth 125 of the inner face 120, then the contact protrusion 130 and the contact plate 140 come into contact.

The compression washer 150 may be made from a hard plastic, such as polyketone.

A threaded fastener 160, such as a wheel stud in FIG. 1, extends through the step washer 100, compression washer 150 and contact plate 140. The threaded fastener 160 is secured by a nut 170, which provides a clamping force on the threaded fastener 160 and causes compression of the compression washer 150, until contact is made between the contact protrusion 130 and the contact plate 140. The contact closes an electric circuit provided through electric contact connections 180, thereby signaling that a sufficient clamping force is exerted on the threaded fastener 160.

Figure 2:
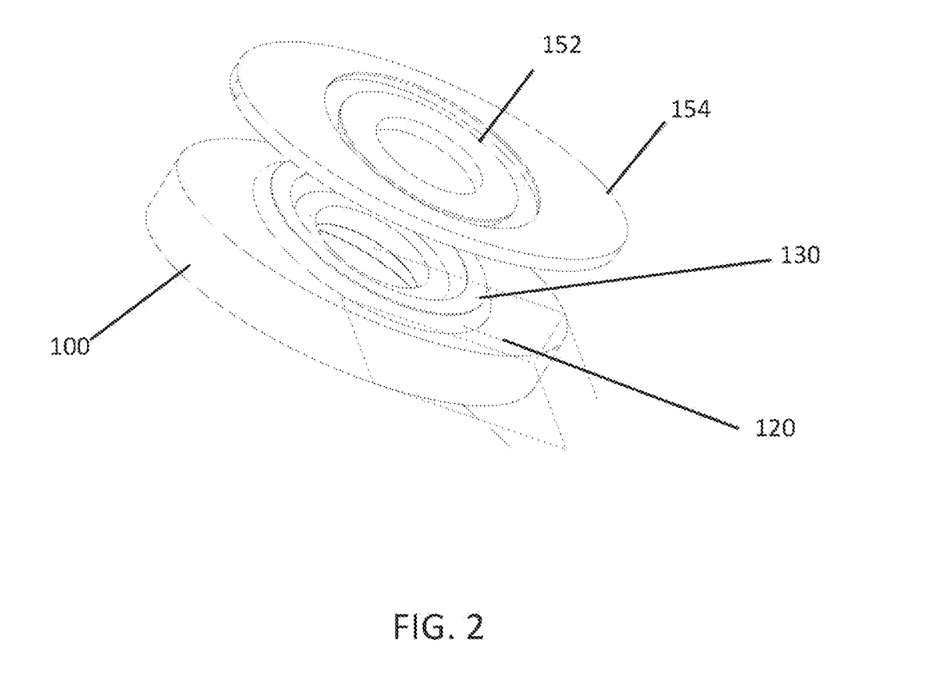
FIG. 2 is a perspective view of compression washers and a step washer of a further embodiment of the clamping force monitoring system.

Referring to FIG. 2, another embodiment of the step washer 100 and compression washer 150 is illustrated. The contact protrusion 130 extends from within the inner face of the step washer 120 and an internal and external compression washer 152, 154 lie against the inner face of the step washer. This arrangement of the internal and external compression washers 152, 154 protect the contact surface of the contact protrusion 130.

Figure 3:
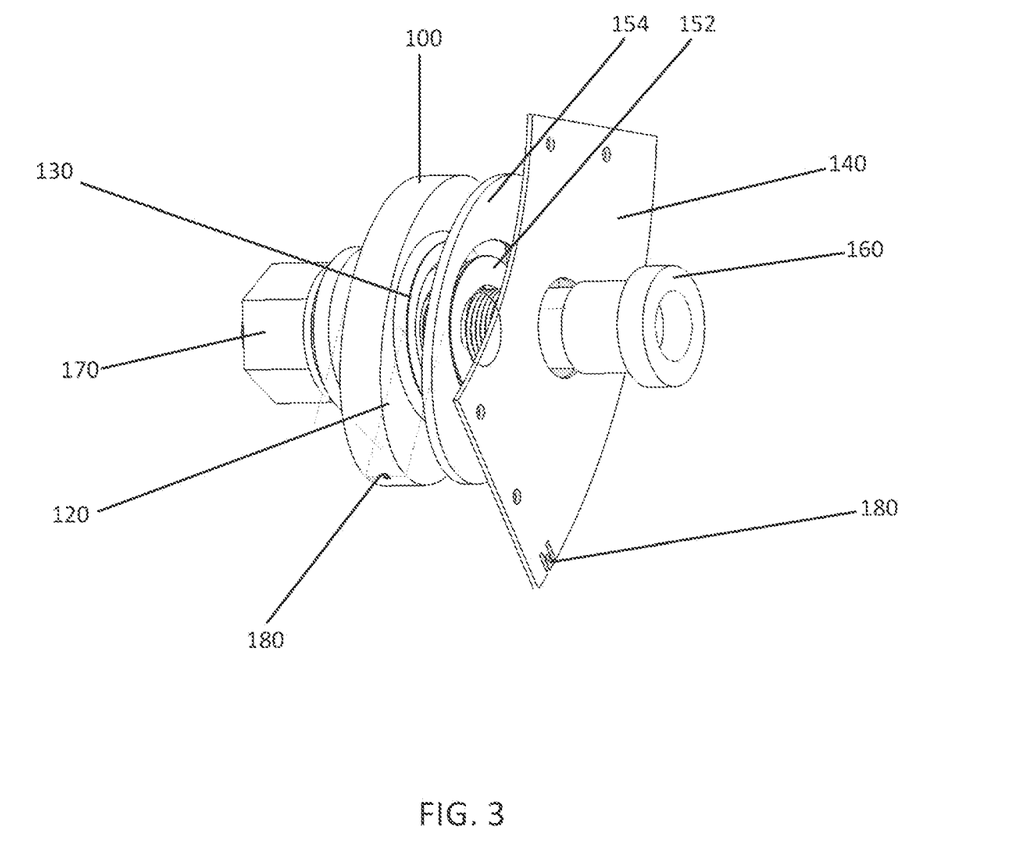
FIG. 3 is an exploded view of the embodiment of the clamping force monitoring system illustrated in FIG. 2.

FIG. 3 illustrates the embodiment of the compression washer of FIG. 2 in the context of the clamping force monitoring system. The threaded fastener 160, in this example a wheel stud, extends through the contact plate 140, compression washers 152, 154 and step washer 100, and is secured by a nut 170. The embodiment is further illustrated by a cross-section in FIG. 4. The step washer 100, internal and external compression washers 152, 154, and contact plate 140 are assembled on the wheel stud 160. The wheel stud 160 does not have a clamping force exerted as it is not secured by a nut 170, thus the internal and external compression washers 152, 154 are not compressed. Consequently, the thickness of the internal and external compression washers is greater than the depth 125 of the contact protrusion 130 and so there is a gap 310 between the contact protrusion and the contact plate 140. In this state the electric circuit is open. The gap 310 is controlled by the thickness and physical characteristics of the compression washer 150 or internal and external compression washers 152, 154, so that the gap closes when a sufficient axial force is applied to the threaded fastener 160.

Figure 4:
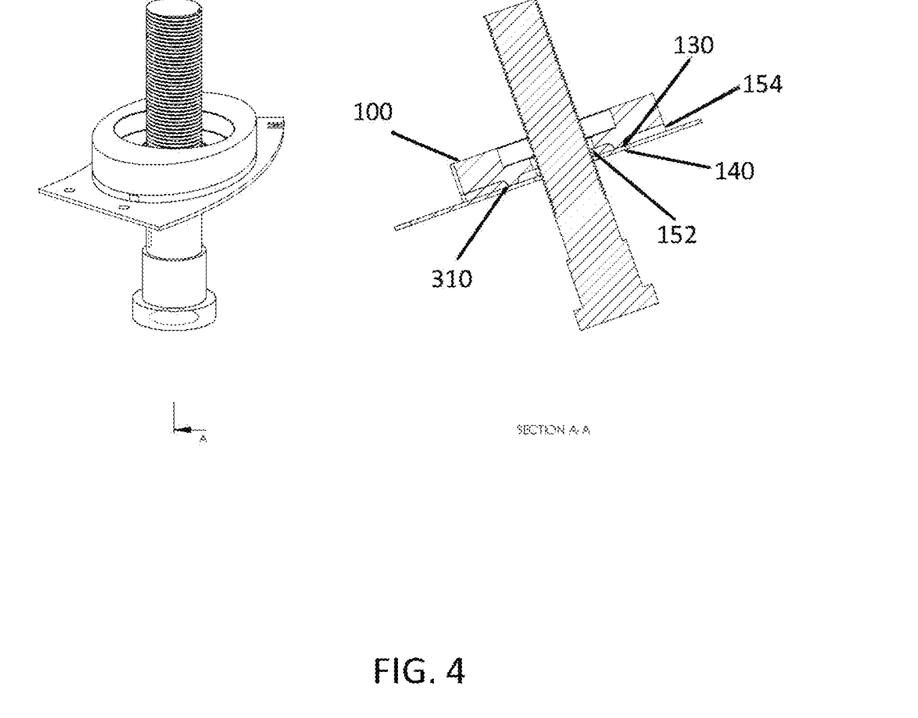
FIG. 4 is a cross-section of the embodiment of the clamping force monitoring system illustrated in FIG. 3.

Referring again to FIG. 3, in an example embodiment, a compression washer 150 or compression washers 152, 154 may be compressed under every second nut 170 on a wheel hub by an amount that represents 25,000 lbs of axial force in the wheel stud 160. When this amount of compression is attained, contact is made between the contact plate 140 and the contact protrusion 130 that completes an electric circuit through electric contact connections 180. If a reduction in the compression occurs by a loosening nut 170, the circuit is broken, and a signal is sent to a vehicle operator and/or dispatch to indicate that a fastener is below a clamping force of 25,000 lbs. As illustrated in FIG. 4, the thickness of the compression washer 150 or compression washers 152, 154 is greater than the depth 125 of the contact protrusion 130, leaving a controlled gap 310. Once 25000 lbs is applied by the nut 170, the thickness of the compression washer 150 or washers 152, 154 is equal to the depth of the contact protrusion 130 and the contact protrusion 130 bottoms out on the contact plate 140 thereby closing a circuit. The nut 170 can be further tightened, and the compression washer 150 or washers 152, 154 will see no further deformation. In this way, 60,000 lb can be applied to the stud while the compression washer sees only 25000 lbs. If the nut 170 loosens to the point where contact is broken, a signal will be sent while just under 25000 lbs is still applied by the compression washer 150 or washers 152, 154 to hold the wheel rim in place.

Figure 5:
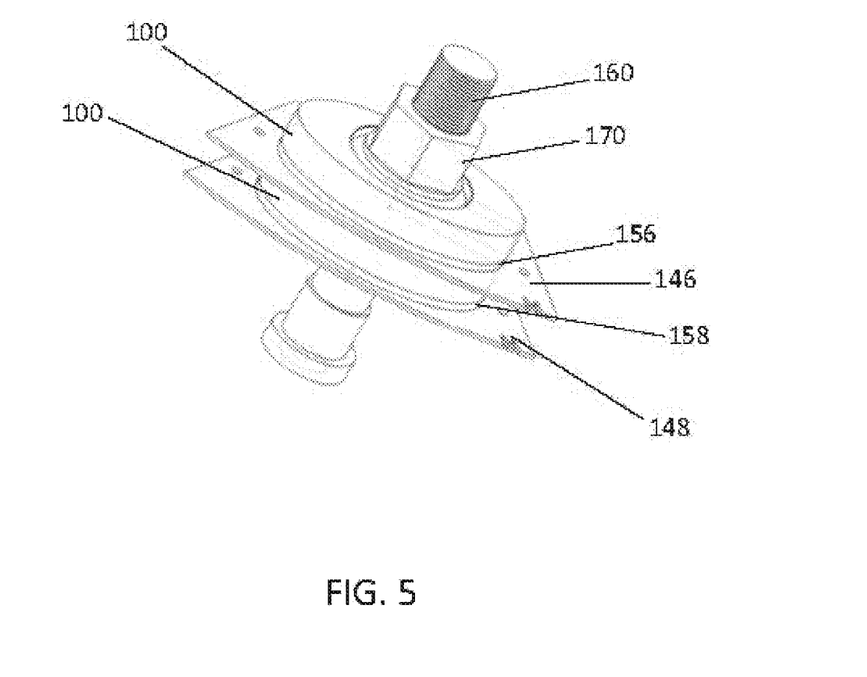
FIG. 5 is a perspective view of a further embodiment of the clamping force monitoring system.

Referring to FIG. 5, a further embodiment is illustrated that addresses a problem in which wheel studs can fail from being over torqued, wherein the yield strength of the stud 160 is exceeded. This problem can be remedied by stacking two compression washers 156, 158 on top of one another, providing two contact points. When the upper compression washer 156 is softer (lower compression module) it will make contact with the upper contact plate 146 before the lower harder washer 158 makes contact the lower contact plate 148. Thus, for instance, the upper set can contact at 25,000 lbs when sufficient clamping force is applied and the lower set can contact at 50,000 lbs when the stud is over torqued. In this case, compression washer materials of varied compressive modulus or compressive area are used to allow for multiple predetermined contact points. As one can see, multiple contact arrangements beyond two can be obtained.

Figure 6:
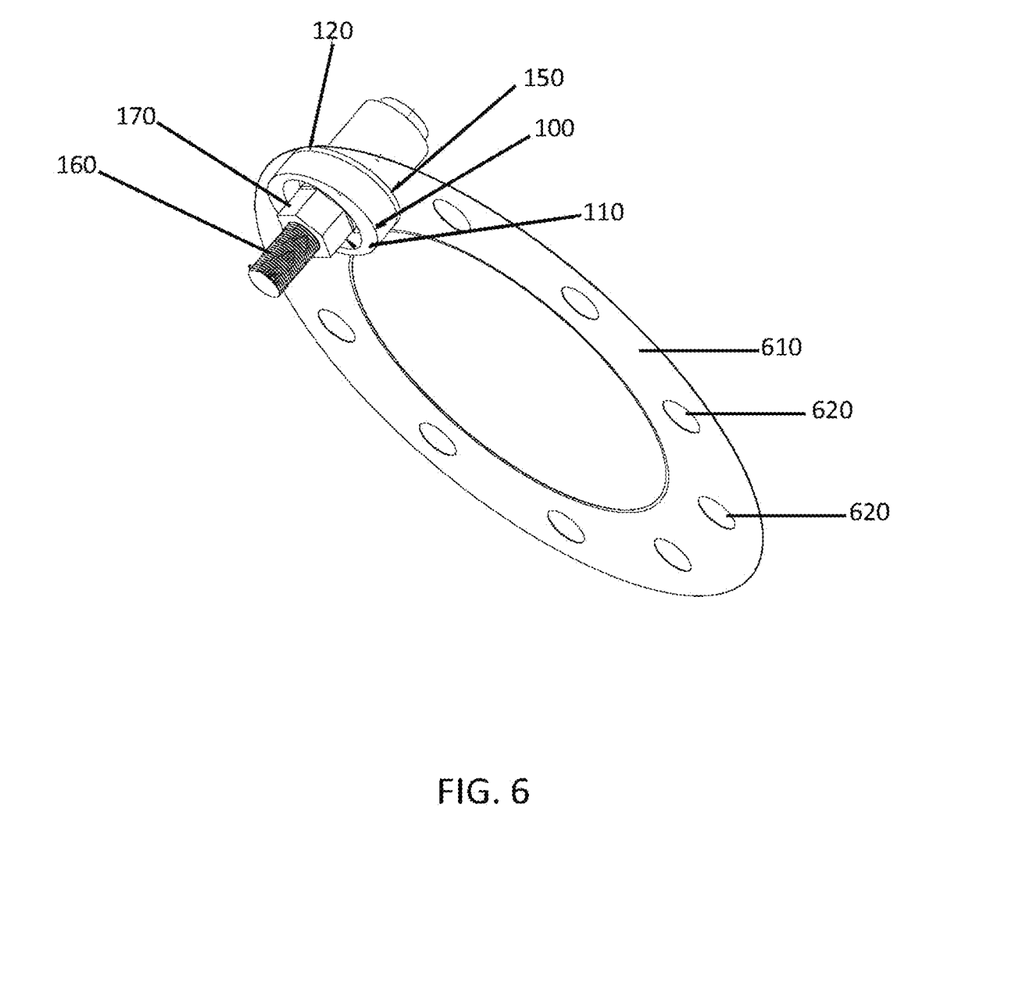
FIG. 6 is a perspective view of a further embodiment of the clamping force monitoring system.

Referring to FIG. 6, an embodiment of the clamping force monitoring device, where the device is a wheel stud monitoring device, may include a hub ring 610 to overlay a wheel hub, with slots 620 aligning with each wheel stud. A contact plate 140, compression washer 150 and step washer 100 are fitted over alternating slots 620 allowing the wheel stud 160 to extend through. An electric circuit is closed when sufficient axial force is exerted in the threaded fastener (wheel stud) 160 by engagement of the nut 170. When there is not sufficient force, the electric circuit is open and transmits a signal. The signal may be transmitted, for example by a battery-operated radio-frequency transmitter circuit. The signal may be transmitted to a remote receiver, such as a signaling device that is visible to a road vehicle operator while the road vehicle is in operation.

Figure 7:
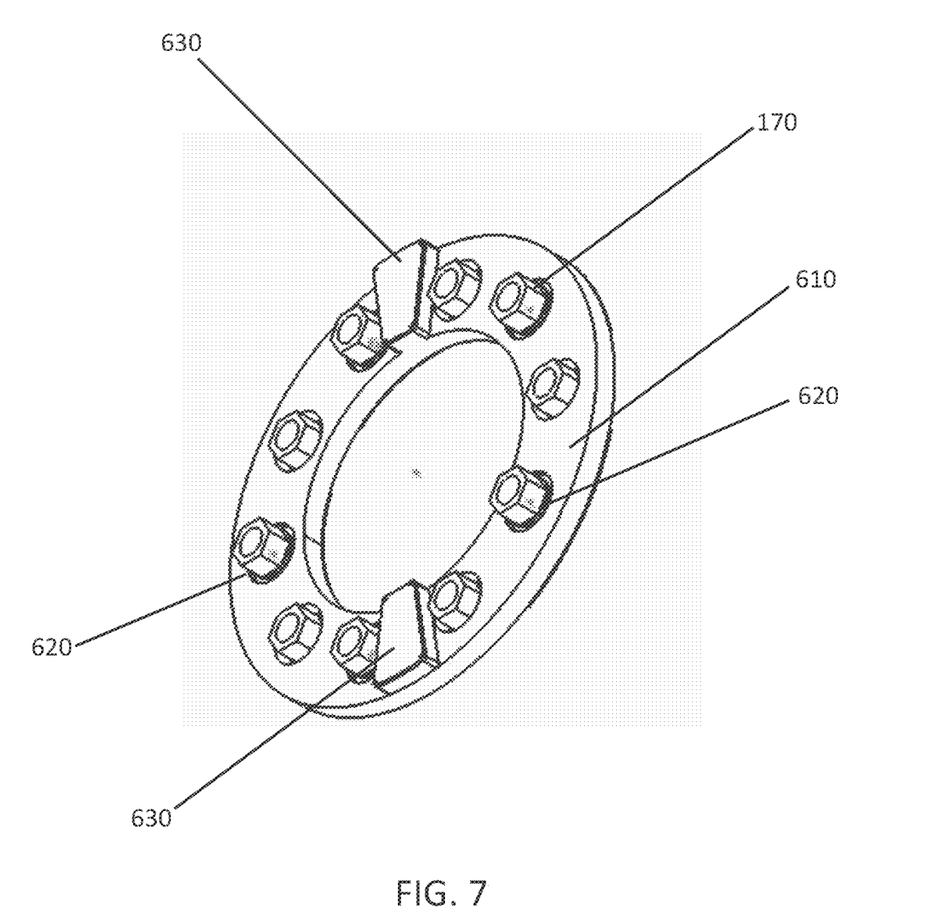
FIG. 7 is a perspective view of the embodiment of the clamping force monitoring system illustrated in FIG. 6.

As further illustrated in FIG. 7, for alternating studs protruding through corresponding alternating slots 620 on a wheel hub, a wire leads from the contact plate 140 and/or step washer 100 (not visible) to a PC board 630. The PC board 630 is mounted to the wheel hub on the ring 610. Contact between the contact plate 140 and the contact protrusion 130 (not visible) closes an electric circuit and sends an electrical signal to the PC board 630. The PC board 630 transmits a signal to the vehicle's warning system to inform the vehicle's operator of a loose nut 170. To transmit a signal, the PC board 630 may communicate by radiofrequency with a signal light or beacon, for example having an LED light, mounted within view of the vehicle operator, for example on the side of a truck trailer. The beacon communication to the vehicle operator occurs while the vehicle is in motion, so the vehicle does not have to be stopped to inspect the wheel stud condition.

The PC board 630 is preferably powered by a battery. The PC board 630 is grounded through an attachment to the wheel hub, for example by a bracket or with a ring connector under the head of one of the studs connected by wire to the PC board (not shown). The PC board 630 also has a transmitter to transmit, by radio signal or otherwise, the conditions of the contact plate 140 and the contact protrusion 120.

While example embodiments are provided of a wheel stud monitoring system, the clamping force monitoring device may be a hydraulic ram or a pipe securing system, or any other system where a force is applied to an outer face of the step washer 110, thereby compressing the compression washer 150 and sufficient force is thereby monitored.

In operation, a clamping force monitoring device is provided where a threaded fastener 160 is extended through a step washer 100 and a compression washer 150 and engaged with a nut 170, causing an axial force to be applied to the threaded fastener and leading to compression of the compression washer. When the compression washer 150 is compressed by sufficient axial force, the contact protrusion 130 of the step washer 100 comes into contact with a contact plate 140 and closes an electric circuit. However, if there is less than the sufficient axial force, for example if a nut is loose on a wheel stud, the compression washer 150 is not compressed and is thicker than the depth of the contact protrusion 130 in the step washer 100. This results in a gap 310 between the contact protrusion 130 of the step washer 100 and the contact plate 140, so the electric circuit is open. The open electric circuit leads to a signal transmission, for example a light signal provided to a vehicle operator, alerting the operator that a wheel stud is not sufficiently tightened. The signal may be transmitted when the axial force on the wheel stud is less than 25,000 lb.

One of the problems that is overcome is that there is a very limited space to apply the compression spring effect that is created by the compression washer. The studs on a wheel are of a limited length and regulations state that the threads of the stud must be at least to the top of their stud nut. This means that the complete device can only be ⅜ to 7/16 inches thick (depending on Rim material thicknesses) The present disclosure provides the ability to apply a monitoring force in the tens of thousands of lbs in a very limited space. For example, the device may apply a maintaining force of 25,000 lb within a ⅜ of an inch space while monitoring movement of a few thousands of an inch.

Figure 8:
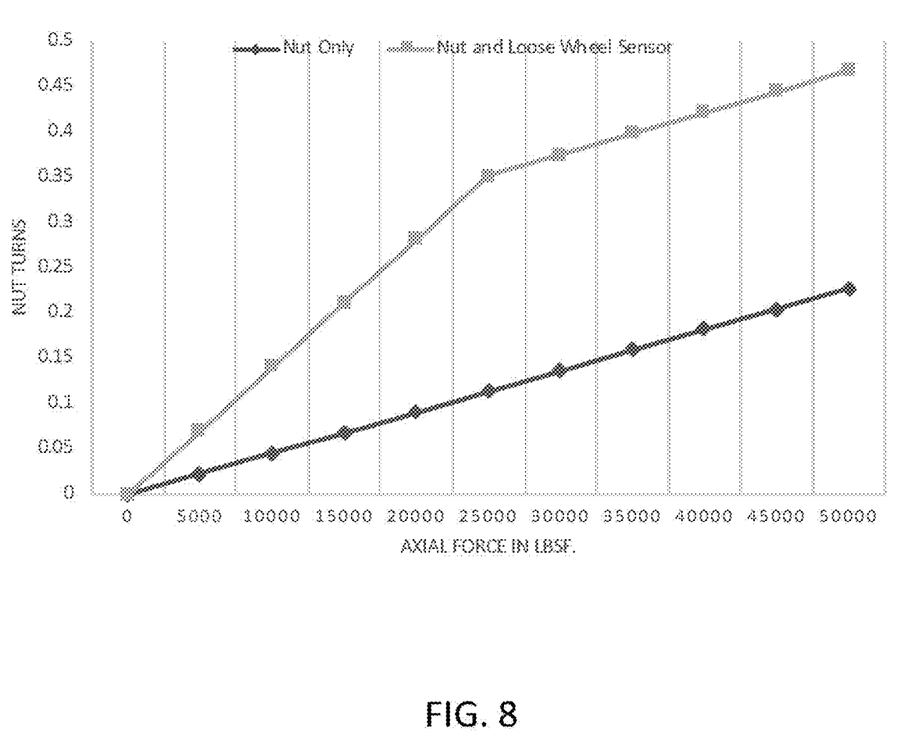
FIG. 8 is a graph relating nut turns versus axial force in the absence or presence of the clamping force monitoring system.

A further advantage of the disclosed device is illustrated in the graph in FIG. 8. The graph shows nut turns versus stud load (axial force) for the disclosed device ("Nut and Loose Wheel Sensor") and for another type of monitoring device commonly used in the field (nut turn monitoring device; NTMD). It takes 0.35 turns or 126 degrees for the disclosed device to reach the electric contact point of 25,000 lb of axial load in the stud. It takes a further 0.11 turns or 43 degrees for the disclosed device to reach the full axial force of 50,000 lbs. Thus (43+126) or 169 degrees are required to attain 50,000 lbs of axial load in the stud. By comparison, the NTMD nut requires 0.23 turns or 82 degrees to reach 50,000 lb. Therefore the disclosed device has almost doubled the amount of loosening (169 degrees vs 82 degrees) that will bring axial load from full grip to zero grip.

A further advantage of the embodiment provided is that when the axial force is below the sufficient level, for example 25.000 lb for a wheel stud, and a signal is transmitted to the vehicle operator, the wheel stud is still secure due to the expansion of the compression washer 150. Thus a safety margin is provided by the expansion of the compression washer 150.

To aid in review of the drawings, a summary of the reference numbers is presented in Table 1, below.

TABLE 1

List of Elements and Reference Label Numbers
To aid in review of the drawings, a summary of the
reference numbers is presented in TABLE 1 below.

| Element | Reference Label |
| --- | --- |
| Step washer | 100 |
| Outer face | 110 |
| Inner face | 120 |
| Depth | 125 |
| Contact protrusion | 130 |
| Contact plate | 140 |
| Upper contact plate | 146 |
| Lower contact plate | 148 |
| Compression washer | 150 |
| Internal and external compression washers | 152 |
| Internal and external compression washers | 154 |
| Two compression washers | 156 |
| Two compression washers | 158 |
| Threaded fastener | 160 |
| Nut | 170 |
| Electric contact connections | 180 |
| Gap | 310 |
| Hub ring | 610 |
| Slots | 620 |
| PC board | 630 |

While embodiments of the clamping force monitoring device have been illustrated in the accompanying drawings and described herein above, it will be appreciated by those skilled in the art that various modifications, alternate constructions and equivalents may be employed. It should be further understood that the claims are not intended to be limited to the particular forms disclosed, but rather to cover all modifications, equivalents, and alternatives falling within the spirit and scope of this disclosure.

Therefore, the above description and illustrations should not be construed as limiting the scope of the invention, which is defined in the appended claims.

What is claimed is:

1. A clamping force monitoring device comprising:
   a step washer having an outer face, an inner face and a contact protrusion protruding to a depth from the inner face;
   a contact plate for making contact with the step washer;
   a compression washer abutting the inner face of the step washer and extending to at least the contact protrusion of the step washer, the compression washer being compressible and having a thickness greater than the protrusion depth when not compressed, for separating the step washer and the contact plate;
   a threaded fastener for extending through the step washer and the compression washer;
   a nut for engaging with the threaded fastener; and
   an electric circuit for sensing a contact condition between the contact plate and the step washer;
   wherein when a sufficient axial force is exerted in the threaded fastener by engagement of the nut, the compression washer is compressed to a thickness equal to the depth of the protrusion and the step washer is in contact with the contact plate, thereby dosing the electric circuit.

2. The clamping force monitoring device of claim 1, wherein the compression washer is made from a hard plastic.

3. The clamping force monitoring device of claim 2, wherein the hard plastic is a polyketone.

4. The clamping force monitoring device of claim 1, wherein the electric circuit comprises a transmitter circuit.

5. The clamping force monitoring device of claim 1, wherein the electric circuit comprises a battery-operated radio-frequency transmitter circuit.

6. The clamping force monitoring device of claim 1, wherein the electric circuit comprises a signal transmitter transmitting the contact condition between the contact plate and the step washer to a remote receiver.

7. The clamping force monitoring device of claim 1, wherein a remote receiver comprises a signaling device within a road vehicle that is visible to a road vehicle operator while the road vehicle is in operation.

8. The clamping force monitoring device of claim 1, further comprising: two step washers; two contact plates; and two compression washers; stacked in a tandem arrangement, and wherein the two compression washers are of different elasticity, for making contact with the respective contact plates at two different sufficient axial forces.

9. The clamping force monitoring device of claim 1, wherein the threaded fastener comprises a wheel stud for securing a vehicle wheel.

10. The clamping force monitoring device of claim 8, wherein the sufficient axial force is 25,000 lb.

11. The clamping force monitoring device of claim 1, wherein the threaded fastener comprises a hydraulic ram.

12. The clamping force monitoring device of claim 1, wherein the threaded fastener comprises a force applied to the outer face of the step washer.

13. A method for monitoring a clamping force on a threaded fastener comprising;
    extending a threaded fastener through a step washer and a compression washer; and
    engaging the threaded fastener with a nut;
    wherein when a sufficient axial force is applied to the threaded fastener by the nut, the compression washer is compressed to a thickness equal to a depth of a protrusion in the step washer and the protrusion in the step washer contacts a contact plate, thereby closing an electric circuit;
    and further wherein when an axial force less than the sufficient axial force is applied to the threaded fastener by the nut, the compression washer is not compressed to a thickness equal to the depth of the protrusion in the step washer and the protrusion in the step washer is not in contact with the contact plate, thereby opening the electric circuit.

14. The method of claim 13, wherein the electric circuit transmits a signal.

15. The method of claim 13, wherein the electric circuit transmits a battery-operated radio-frequency signal.

16. The method of claim 13, wherein the electric circuit transmits a signal to a remote receiver.

17. The method of claim 13, wherein a remote receiver in a road vehicle transmits a visible signal to a road vehicle operator while the road vehicle is in operation.

18. The method of claim 13, wherein the threaded fastener comprises a wheel stud for securing a vehicle wheel.

19. The method of claim 17, wherein the sufficient axial force is 25,000 lb.

* * * * *

UNITED STATES PATENT AND TRADEMARK OFFICE
CERTIFICATE OF CORRECTION

PATENT NO. : 11,946,500 B2
APPLICATION NO. : 16/988515
DATED : April 2, 2024
INVENTOR(S) : Markus Jaan Hess It is certified that error appears in the above-identified patent and that said Letters Patent is hereby corrected as shown below:

In the Claims

Column 7, Line 22-23 in the last sentence of Claim 1, the portion reading "thereby dosing the electric circuit" should read "thereby closing the electric circuit."

Signed and Sealed this
Third Day of September, 2024

*Katherine Kelly Vidal*

Katherine Kelly Vidal
*Director of the United States Patent and Trademark Office*